United States Patent [19]

Daman

[11] 4,336,769
[45] Jun. 29, 1982

[54] INTEGRAL VAPOR GENERATOR/GASIFIER SYSTEM

[75] Inventor: Ernest L. Daman, Westfield, N.J.

[73] Assignee: Foster Wheeler Energy Corporation, Livingston, N.J.

[21] Appl. No.: 249,565

[22] Filed: Mar. 31, 1981

[51] Int. Cl.³ ............................................. F28D 13/00
[52] U.S. Cl. .................................. 122/4 D; 48/128; 110/229; 110/245
[58] Field of Search ............ 122/4 D, 5, 7; 110/245, 110/342, 229, 347; 48/128

[56] References Cited

U.S. PATENT DOCUMENTS

| | | | |
|---|---|---|---|
| 3,807,090 | 4/1974 | Moss | 48/128 |
| 3,818,869 | 6/1974 | Blaskowski | 122/5 |
| 3,905,336 | 9/1975 | Gamble et al. | 122/4 D |
| 4,279,205 | 7/1981 | Perkins et al. | 122/4 D |
| 4,290,387 | 9/1981 | De Feo et al. | 122/4 D |

Primary Examiner—Henry C. Yuen
Attorney, Agent, or Firm—Marvin A. Naigur; John E. Wilson; Warren B. Kice

[57] ABSTRACT

An integral generator/gasifier system in which a vapor generator is provided that includes an upright furnace section and a plurality of nozzles, each having one end registering with the interior of the furnace section. A gasifier extends adjacent to the furnace section and supports a bed of adsorbent material for the sulfur generated as a result of the gasification of fuel introduced to the gasifier. Air is passed through the bed of adsorbent material to fluidize said material so that, upon gasification of the fuel, a substantially sulfur-free product gas is produced. The other ends of the nozzles communicate with the gasifier so that the product gas passes from the gasifier through the nozzles and into the furnace section for combustion.

9 Claims, 3 Drawing Figures

INTEGRAL VAPOR GENERATOR/GASIFIER SYSTEM

BACKGROUND OF THE INVENTION

This invention relates to a vapor generating system and, more particularly, to such a system in which a vapor generator burns a relatively low BTU product as essentially free of sulfur which is generated by a gasifier located integrally with the vapor generator.

The Environmental Protection Agency and various state agencies have established standards of performance that define maximum allowable sulfur dioxide emission levels for fossil fueled power stations. In response to these standards, a generation of stack gas clean up equipment has been designed to remove, or scrub, sulfur dioxide from the steam generator flue gases prior to release into the atmosphere. Since large volumes of gas with dilute sulfur dioxide concentrations are encounted at the steam generator exit, the stack gas clean up equipment becomes large and expensive.

Instead of controlling sulfur dioxide emissions by treating the stack gases it is advantageous to remove sulfur from the fuel prior to combustion in the steam generator, since at this stage the volume of gases requiring treatment is significantly reduced. To this end a gasification process has evolved that involves the partial combustion of fuel, such as heavy fuel oil or particulate coal, in a fluidized bed of lime particles. Desulfurization is accomplished through reaction with the lime particles and a combustible off-gas is produced that is ducted to a steam generator where combustion is completed in commercially available gas burners.

However in these systems, hot gas ducting has to be provided along with a cyclone separator in the case of particulate coal, to pass the product gas from the gasifier to the steam generator. However, this equipment is expensive and, in addition, since the cyclone separators were less than completely efficient, the coal particles would enter the furnace and cause an appreciable build up of carbon. Therefore, the furnace and/or the gasifier had to be designed to burn the carbon, which often comprised the efficiency of the system. Accordingly, it is an object of the present invention to provide a two-stage combustion system with sulfur removal in the first stage gasifier and combustion of the gas together with the carbon particulates in the second stage furnace.

SUMMARY OF THE INVENTION

It is therefore an object of the present invention to provide a vapor generator/gasifier system in which sulfur is removed from the fuel prior to combustion in the vapor generator.

It is a further object of the present invention to provide a system of the above type in which a chemically active fluidized bed is provided for producing a product gas substantially free of sulfur which is passed to the vapor generator.

It is a still further object of the present invention to provide a system of the above type in which the sulfur free product gas is generated in a gasifier and passed to the vapor generator without the use of ducting and/or cyclone separators.

It is a still further object of the present invention to provide a system of the above type in which the gasifier is formed integrally with the vapor generator.

Toward the fulfillment of these and other objects, the system of the present invention comprises a vapor generator including an upright furnace section and a plurality of nozzles, each having one end registering with the interior of the furnace section. A gasifier extends adjacent the furnace section and supports a bed of adsorbent material for the sulfur generated as a result of the combustion of fuel introduced into the bed. Air is passed through the bed of adsorbent material to fluidize the material so that, upon combustion of the fuel, a substantially sulfur-free product gas is produced. The other end of the nozzles communicate with said gasifier so that said product gas passes from the gasifier, through the nozzles and into the furnace section for combustion.

BRIEF DESCRIPTION OF THE DRAWINGS

The above brief description, as well as further objects, features and advantages of the present invention will be more fully appreciated by reference to the following detailed description of the presently preferred but nonetheless illustrative embodiment in accordance with the present invention when taken in conjunction with the accompanying drawings in which.

DESCRIPTION OF THE PREFERRED EMBODIMENT

Figure 1:
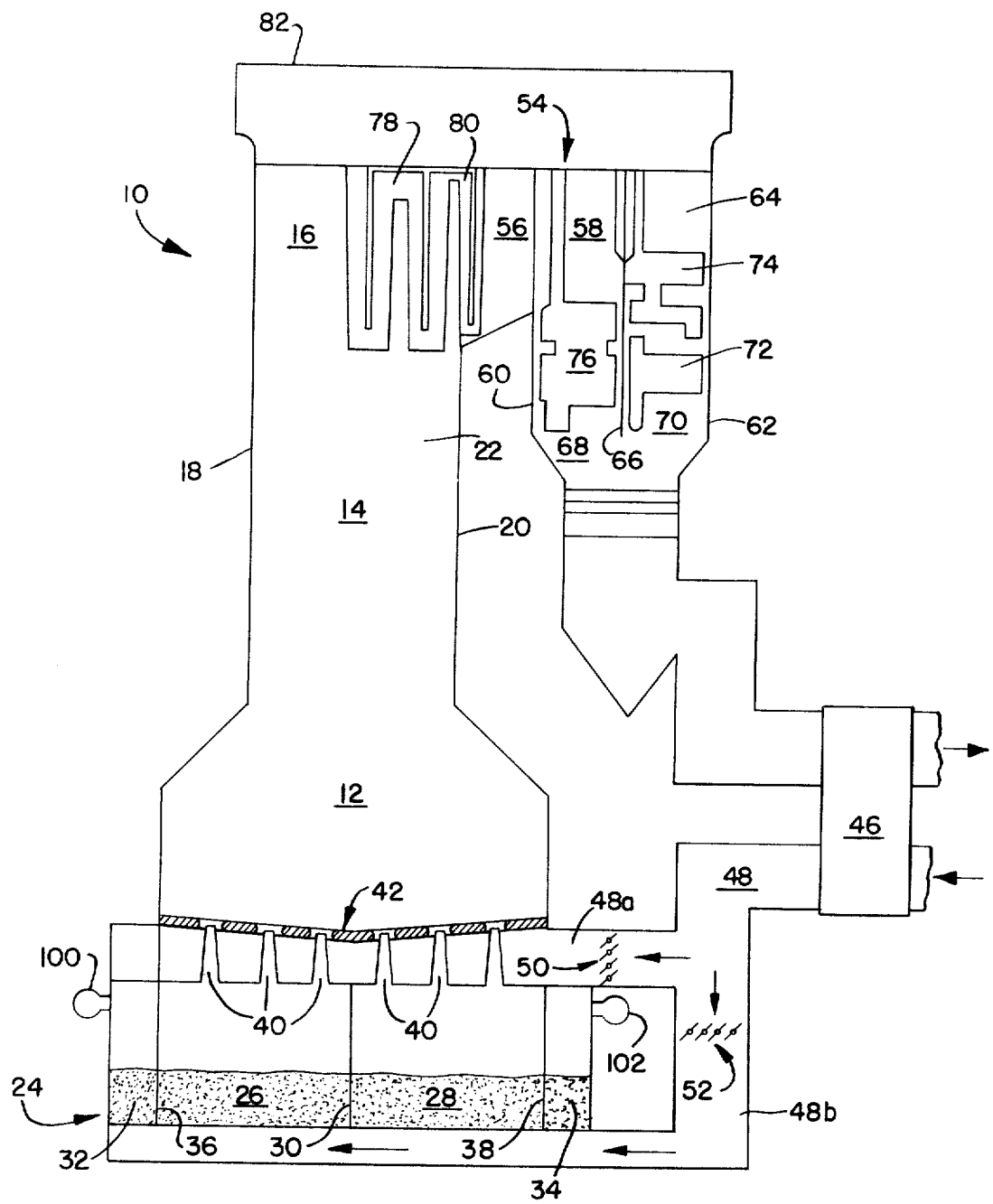
FIG. 1 is a schematic sectional view of the steam generating/gasifying system of the present invention.

Referring specifically to FIG. 1 of the drawings, the reference numeral 10 refers in general to a vapor generator utilized in the system of the present invention which includes a lower furnace section 12, an intermediate furnace section 14, and an upper furnace section 16. The boundary walls defining the furnace sections 12, 14 and 16 include a front wall 18, a rear wall 20 and two sidewalls extending between the front and rear wall, with one of said sidewalls being referred to by the reference numeral 22.

Although only shown schematically for the convenience of presentation, it is understood that each of the walls 18, 20, and 22 are formed of a plurality of tubes having continuous fins extending outwardly from diametrically opposed portions thereof, with the fins of adjacent tubes being connected together in any known manner, such as by welding, to form a gas-tight structure.

The lower portions of the front wall 18 and the rear wall 20 are sloped outwardly from the intermediate furnace section 14, and then downwardly, so that the lower furnace section 12 is enlarged for the purpose of receiving an integral gasifier, shown in general by the reference numeral 24. The gasifier consists of two gasifying sections 26 and 28 separated by a partition 30, and two regenerating sections 32 and 34 separated from their respective gasifying sections 26 and 28 by partitions 36 and 38, respectively.

A plurality of nozzles 40 communicate with the upper portion of the gasifier sections 26 and 28 and extend into openings forming in a refractory material 42 forming the floor of the lower furnace section 12.

A preheater 46 is provided in a heat exchange relation with a duct 48 which receives air from an external source and which branches into a duct 48a communicating with the openings formed in the refractory material 42 and a duct 48b extending below the gasifying sections 26 and 28 and the regenerating sections 32 and 34 and communicating therewith. A series of dampers 50 are provided in the duct 48a and a series of dampers 52 are provided in the duct 48b for controlling the flow of air through the ducts. Further details of the arrangement and operation of the gasifier 24 will be described later.

A heat recovery area, shown in general by the reference numeral 54 is provided adjacent the upper furnace section 16 in gas flow communication therewith and includes a vestibule section 56 and a convection section 58.

The convection section 58 includes a front wall 60, a rear wall 62 and two sidewalls 64, with one of the latter being shown in FIG. 1. It is understood that the rear wall 62, the sidewalls 64, and the lower portions of the front wall 60 are formed of a plurality of vertically extending, finned, interconnected tubes in a similar manner to that of the furnace sections, and that slots or openings are provided in the upper portion of the wall 60 to permit communication between the vestibule section and the convection section 58.

A partition wall 66, also formed by a plurality of finned interconnected tubes, is provided in the convection section 58 to divide the latter into a front gas pass 68 and a rear gas pass 70. An economizer 72 is disposed in the lower portion of the rear gas pass 70, a primary superheater 74 is disposed immediately above the economizer, and a bank of reheater tubes 76 is provided in the front gas pass 68.

A platen superheater 78 is provided in the upper furnace section 16 and a finishing superheater 80 is provided in the vestibule section 56 in direct fluid communication with the platen superheater 78.

Although not shown in the drawings, it is understood that a plurality of division walls, each formed by a plurality of finned interconnected tubes, could be provided with a portion of each wall being disposed adjacent the intermediate furnace section 14 and the front wall 18. The division walls would penetrate a portion of the tubes of the front wall 18 and extend upwardly within the intermediate furnace section 14 and the upper furnace section 16.

A roof 82 is disposed in the upper portion of the vapor generator 10 and consists of a plurality of tubes having fins connected in the manner described above but extending horizontally from the front wall 18 of the furnace section to the rear wall 62 of the convection section 58.

Figure 2:
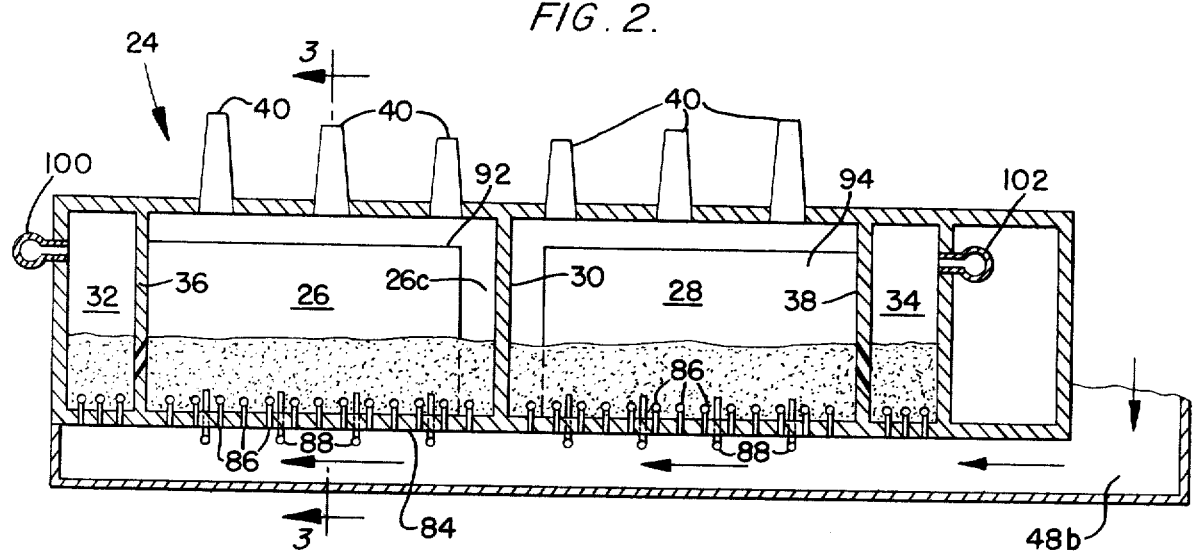
FIG. 2 is an enlarged sectional view depicting a portion of the system of FIG. 1.
Figure 3:
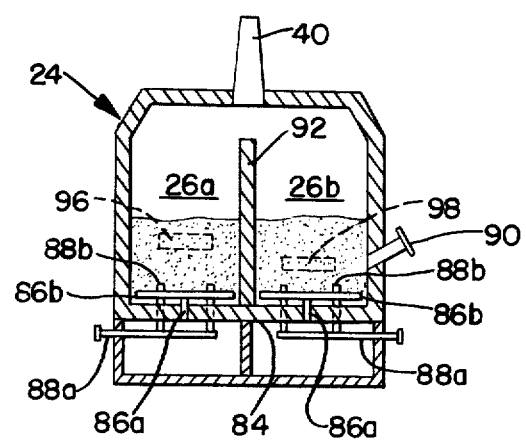
FIG. 3 is a cross-sectional view taken along the lines 3—3 of FIG. 2.

Referring to FIGS. 2 and 3, the gasifier 24 includes a perforated floor, or grate, 84 which receives a plurality of T-shaped air distributor pipe assemblies 86 which receive air from the duct 48b and introduces the air into the gasifying section 26 and 28 and the regenerating sections 32 and 34. As better shown in FIG. 3, each pipe assembly 86 includes a vertical pipe 86a which extends through an opening in the floor 84 and a horizontal pipe 86b connected in registry with the vertical pipe.

A plurality of fuel distributor pipe assemblies 88 extend through other openings in the floor 84 below the gasifying sections 26 and 28, with each assembly including a horizontal pipe 88a extending below the floor 84 and a vertical pipe 88b extending through an opening in the floor and connected in registry with the vertical pipe. An end portion of each horizontal pipe 88a extends through a sidewall of the gasifier 24 and is adapted to be connected to a source of fuel (not shown) which could be oil or particulate coal.

A feeder 90 extends through a sidewall of the gasifier 24 and is adapted to feed an adsorbent, such as limestone, into the gasifying section 26, it being understood that a similar feeder is provided in communication with the gasifying section 28.

Divider walls 92 and 94 are disposed in the gasifying sections 26 and 28, respectively, with the divider wall 92 dividing the section 26 into chambers 26a and 26b (FIG. 3). The divider wall 92 extends from the partition 36 (FIG. 2) to an area spaced from the partition 30 to define a passage 26c (FIG. 3) communicating with the chambers 26a and 26b.

An inlet slot 96 and an outlet slot 98 are formed in the partition 36 with the former communicating the chamber 26a with the regenerating section 32 and the latter communicating the chamber 26b with the regenerating section.

As a result of this arrangement a mixture of limestone and a fuel continually flows from the chamber 26b, around the passage 26c, through the chamber 26a and the slot 96 and into the regenerating section 32 and, from the latter section, through the slot 98 and into the chamber 26b for recirculation. It is understood that, by virtue of the partition wall 94 and slots formed in the partition 38, circulation through the gasifying section 28 and the regenerating section 34 is achieved in an identical manner.

A discharge manifold 100 communicates with the upper portion of the regenerating section 32 and a discharge manifold 102 communicates with the upper portion of the regenerating section 34 to discharge the sulfur gas produced in the regenerating sections to external sulfur recovery equipment (not shown).

In operation, the temperature in each fluidized bed in the gasifying sections 26 and 28 is maintained at a predetermined elevated value (such as 1600° F.) by control of the fuel entering the beds, and air from the duct 48b is admitted into the latter sections through the air distributor pipe assemblies 86 in substoichiometric proportions to limit the amount of combustion and heat release; while flue gas is used an an inert, heat absorbing medium to control the overall process temperature.

Partial combustion of the fuel entering the gasifying sections 26 and 28 with approximately 25 to 30% stoichiometric air furnishes sufficient heat to partially combust the fuel, and, when applicable, to vaporize and crack the remaining oil. This partial combustion results in the formation of hydrogen sulfide which reacts with the fluidized bed of lime to form calcium sulfide and water. The gaseous product of this process is an essentially sulfur free and vanadium free fuel gas possessing a heating value of approximately 200 BTU/cu. ft. This gas rises in the gasifying sections 26 and 28 by natural convection and enters the nozzles 40 and passes through the nozzles into the lower furnace section 12 where it combines with the air from the duct 48a passing around the nozzles 40 and through the aforementioned openings in the refractory material 42, so that combustion is completed in a conventional manner. The capacity for sulfur retention by the gasifying sections 26 and 28 is maintained by the continuous removal of the sulfated lime and the replenishing this material with sulfur free lime through the feeders 90.

Air from the duct 48b is admitted into the regenerating sections 32 and 34 through the pipe assemblies 86 and the calcium sulfide formed in the gasifying sections 26 and 28 is circulated through the regenerating sections 32 and 34, respectively, as discussed above, to convert the calcium sulfide to calcium oxide while producing an off-gas with a high sulfur dioxide concentration. As the calcium sulfide is transferred into the oxygen rich regenerating sections 32 and 34 (preferably at about 1900° F.) the following reaction takes place:

$$CaSO_4 + CaS + O_2 \rightarrow 2CaO + 2SO_2$$

The sulfur dioxide formed by the above reaction leaves the regenerating sections 32 and 34 through the discharge manifolds 100 and 102, respectively, and is recovered by external equipment from the gas stream in the form of elemental surfur, while calcium oxide is recirculated back to the gasifying sections 26 and 28 for re-use as a sulfur absorbent.

Referring again to FIG. 1, the combustion gases produced as a result of the combustion of the sulfur free product gases from the gasifier 24 in the lower furnace section 12 pass upwardly to the upper furnace section 16 and through the heat recovery area 54 before exiting from the front gas pass 46 and the rear gas pass 48. As a result, the hot gases pass over the platen superheater 78, the finishing superheater 80 and the primary superheater 54, as well as the reheater 76 and the economizer 72 to add heat to the fluid flowing through these circuits. The hot gases then pass through the air preheater 46 to preheat the air entering the duct 48.

Although not shown in the drawings for clarity of presentation, it is understood that suitable inlet and outlet headers, downcomers and conduits, are provided to place the tubes of each of the aforementioned walls and heat exchangers as well as the roof in fluid communication to establish a flow circuit for connecting the water to vapor. To this end, feedwater from an external source is passed through the economizer 72 to raise the temperature of the water before it is passed to inlet headers (not shown) provided at the lower portions of the furnace walls 18, 20 and 22. All of the water flows upwardly and simultaneously through the walls 18, 20 and 22 to raise the temperature of the water further to convert at least a portion of same to vapor, before it is collected in suitable headers located at the upper portion of the vapor generator 10. The fluid is then passed downwardly through suitable downcomers, or the like, and then upwardly through the aforementioned division walls to add additional heat to the fluid. The fluid is then directed through the walls 60, 62 and 66 of the heat recovery area 54 after which it is collected and passed through the roof 82. From the roof 82, the fluid is passed via suitable collection headers, or the like, to separators (not shown) which separate the vapor portion of the fluid from the liquid portion thereof. The liquid portion is passed from the separators to a drain manifold and heat recovery circuitry (not shown) for further treatment, and the vapor portion of the fluid in the separators is passed directly into the primary superheater 74. From the latter, the fluid is spray attemperated after which it is passed to the platen superheater 78 and the finishing superheater 80 before it is passed in a dry vapor state to a turbine, or the like.

As a result of the foregoing a sulfur free product is produced and is introduced directly into the vapor generator without the need for hot gas ducting and cyclone separators.

A latitude of modification, change and substitution is intended in the foregoing disclosure and in some instances some features of the invention will be employed without a corresponding use of other features. Accordingly, it is appropriate that the appended claims be construed broadly and in a manner consistent with the spirit and scope of the invention therein.

What is claimed is:

1. An integral generator/gasifier system comprising a vapor generator including an upright furnace section and a plurality of nozzles, each having one end registering with the interior of said furnace section, a gasifier extending adjacent said furnace section, means for introducing fuel to said gasifier, means in said gasifier for supporting a bed of adsorbent material for the sulfur generated as a result of the gasification of said fuel, means for passing air through said bed of adsorbent material to fluidize said material so that, upon gasification of said fuel, a substantially sulfur-free product gas is produced, the other end of said nozzles communicating with said gasifier so that the said product gas passes from said gasifier, through said nozzles and into said furnace section such that combustion of the gas and unreacted carbon occurs.

2. The system of claim 1 wherein said gasifier includes means for regenerating the adsorbent containing said sulfur to produce a sulfur gas.

3. The system of claim 1 wherein said fuel is oil which is injected into said fluidized bed.

4. The system of claim 1 wherein said fuel is coal which is introduced into said fluidized bed.

5. The system of claim 1 wherein said gasifier extends underneath said furnace section.

6. The system of claim 5 wherein said furnace section includes four upright walls and a horizontal floor, and wherein said gasifier is formed by two upright walls extending downwardly from said floor.

7. The system of claim 6 wherein said bed supporting means comprises a grate extending in a spaced relation to said floor.

8. The system of claim 6 wherein said upright walls of said furnace section are formed by a plurality of tubes for receiving water to convert said water to steam.

9. The system of claim 1 wherein said generator is integrally formed with a sorbent regenerator.

* * * * *